United States Patent
Kantor et al.

(10) Patent No.: US 9,686,294 B2
(45) Date of Patent: Jun. 20, 2017

(54) PROTECTION OF COMMUNICATION ON A VEHICULAR NETWORK VIA A REMOTE SECURITY SERVICE

(71) Applicant: CHECK POINT SOFTWARE TECHNOLOGIES LTD., Tel Aviv (IL)

(72) Inventors: Alon Kantor, Tel Aviv (IL); Tamir Zegman, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 65 days.

(21) Appl. No.: 14/738,935

(22) Filed: Jun. 15, 2015

(65) Prior Publication Data
US 2016/0366156 A1    Dec. 15, 2016

(51) Int. Cl.
H04L 29/06    (2006.01)

(52) U.S. Cl.
CPC ...... *H04L 63/1416* (2013.01); *H04L 63/1433* (2013.01); *H04L 63/1441* (2013.01); *H04L 63/20* (2013.01)

(58) Field of Classification Search
None
See application file for complete search history.

(56) References Cited

U.S. PATENT DOCUMENTS

| 8,955,130 | B1 | 2/2015 | Kalintsev et al. |
| 9,231,936 | B1* | 1/2016 | Wang ...................... H04L 63/08 |
| 2010/0162399 | A1* | 6/2010 | Sheleheda ........... H04L 63/1416 726/24 |
| 2011/0080302 | A1* | 4/2011 | Muthaiah ................ H04L 47/10 340/903 |
| 2011/0258431 | A1* | 10/2011 | Gundavelli ....... H04L 29/12254 713/150 |
| 2013/0279500 | A1* | 10/2013 | Yousefi .................. H04N 7/183 370/355 |
| 2014/0165191 | A1* | 6/2014 | Ahn ..................... H04L 63/1425 726/22 |
| 2015/0089236 | A1* | 3/2015 | Han ...................... H04L 9/3242 713/181 |
| 2015/0113638 | A1* | 4/2015 | Valasek ............... H04L 63/1441 726/22 |
| 2015/0195297 | A1* | 7/2015 | Ben Noon ............ B60R 16/023 726/22 |
| 2015/0358351 | A1 | 12/2015 | Otsuka et al. |
| 2016/0255154 | A1* | 9/2016 | Kim ......................... H04L 9/00 726/25 |

FOREIGN PATENT DOCUMENTS

WO    2014115455 A1    7/2014

* cited by examiner

*Primary Examiner* — Trang Doan
(74) *Attorney, Agent, or Firm* — Mark M. Friedman

(57) ABSTRACT

Methods and systems for protecting components of a linked vehicle from cyber-attack are disclosed. These methods and systems comprise elements of hardware and software for receiving a packet; tunneling the packet to a terrestrial-based security service, analyzing whether the packet is harmful to a component in the vehicle, and at least one action to protect at least one component.

17 Claims, 7 Drawing Sheets

PROTECTION OF COMMUNICATION ON A VEHICULAR NETWORK VIA A REMOTE SECURITY SERVICE

TECHNICAL FIELD

The present invention relates to methods and systems for prevention of malicious or unintentional disruption intravehicular communication systems.

BACKGROUND

The automotive industry is using networks to connect together devices and microcontrollers inside vehicles. These networks may utilize, for example, CANbus, Ethernet, and the like.

On such networks, some nodes can control physical components, for example, through actuators. Other nodes only need to receive sensor feedback and possibly present this information to end users. Examples of nodes in such a networked automotive environment include the engine control unit, battery control unit, transmission control unit, airbag control unit, in-car entertainment system and the like.

This heterogeneous environment can create serious security risks. A malicious party may potentially compromise one of these components by using one of the external interfaces exposed by the vehicle. Once such a component is compromised, an attacker can use it as a starting point for attacking other components. An attacker can thus compromise critical vehicle components such as the locking system, the braking system and the engine.

By compromising critical vehicle components, an attacker can disable or cause serious damage to the car or its surroundings, or even cause serious injury or death.

SUMMARY OF THE INVENTION

The invention discloses methods and systems for mitigating cyber-attacks against a vehicle and its components by securely offloading a subset of packet traffic to a remote security service which resides in a terrestrially-located physical or virtual server. The remote security server analyzes packet traffic to detect possible cyber attacks against the vehicle or evidence of compromise of one of the vehicle components, and forwards benign traffic between the vehicle and its communication peers. Additionally, methods and systems for securing privacy and integrity of the communication channel between the vehicle and terrestrial server are disclosed.

Embodiments of the present invention are directed to a method, which is computer-implemented, for mitigating cyber-attacks against a linked vehicle. The method comprises: receiving a packet from a vehicle component; tunneling the received packet to a terrestrial-based security service; analyzing whether the tunneled packet is suspected to be part of a cyber-attack; and based on the analysis that the tunneled packet is suspected to be part of a cyber-attack, taking at least one action to protect at least one of the vehicle components.

Optionally, the method additionally comprises, prior to the tunneling of the received packet to a terrestrial-based security service: classifying the packet; and, based on the result of the classification, tunneling the received packet to a terrestrial-based security service.

Optionally the analysis of whether a tunneled packet is suspected to be part of a cyber-attack comprises: selecting at least one process from the group consisting of: inspecting the data in the packet for non-conformance to static requirements of protocol correctness; inspecting data in the packet for non-conformance to session-contextual requirements of protocol correctness; inspecting data in the packet for exploitation of a vulnerability in a protocol implementation; inspecting the packet to determine whether it includes a bit pattern that is characteristic of cyber-attack packets.

Optionally, the at least one action to protect at least one of the components comprises: blocking the packet.

Optionally, the at least one action to protect at least one of the components comprises: raising an alert.

Embodiments of the present invention are directed to a method, which is computer-implemented, for mitigating cyber-attacks against a linked vehicle. The method comprises: reception, by a terrestrial-based security service, of a packet destined to a vehicle; analyzing whether the received packet is suspected to be part of a cyber-attack; and based on the analysis that the received packet is suspected to be part of a cyber-attack, taking at least one action to protect at least one of the vehicle components.

Optionally the analysis of whether a tunneled packet is suspected to be part of a cyber-attack comprises: selecting at least one process from the group consisting of: inspecting the data in the packet for non-conformance to static requirements of correctness of a protocol; inspecting data in the packet for non-conformance to session-contextual requirements of correctness of a protocol: inspecting data in the packet for exploitation of a vulnerability in a protocol implementation; measuring the rate of packet arrival to determine whether a particular maximum threshold arrival rate has been exceeded; and inspecting the packet to determine whether it includes a bit pattern that is characteristic of cyber-attack packets.

Optionally, the at least one action to protect at least one of the components comprises: blocking the packet.

Optionally, the at least one action to protect at least one of the components comprises: raising an alert.

Embodiments of the present invention are directed to a method, which is computer-implemented, for protecting communications between a linked vehicle and a terrestrial peer, wherein the vehicle and terrestrial peer share a secret key. The method comprises: applying an encryption algorithm to data for transmission; applying an integrity protection algorithm to data for transmission, to create a cryptographic hash; and transmitting the encrypted data and cryptographic hash to the remote peer using a format recognized by the remote peer.

Optionally, the format used for transmitting the encrypted data and cryptographic hash is IPSEC.

Optionally, the format used for transmitting the encrypted data and cryptographic hash is TLS.

Embodiments of the present invention are directed to a method, which is computer-implemented, for protecting communications between a linked vehicle and a terrestrial peer, wherein the vehicle and terrestrial peer share a secret key. The method comprises: applying an integrity protection algorithm to received data and determining whether the result matches a received cryptographic hash; according to the result of the matching of the cryptographic hash, applying a decryption algorithm to received data: and accepting the decrypted data for further processing.

Embodiments of the present invention are directed to a method, which is computer-implemented, for controlling access to network services within a linked vehicle, comprising: receiving a packet from a vehicle component; inspecting the packet to determine an associated application; according to whether the determined associated application was HTTP, determining a requested URL; according to the determined application information, taking an action specified by vehicle policy.

Optionally, the action specified by vehicle policy is logging use of an application.

Optionally, the action specified by vehicle policy is blocking the packet.

Embodiments of the present invention are directed to a computer system to mitigate a cyber-attack on a linked vehicle. The computer system comprises: a storage medium for storing computer components; and a computerized processor for executing the computer components comprising: a first computer component for receiving a tunneled packet from a linked vehicle; a second computer component for analyzing whether a tunneled packet is suspected to be part of a cyber-attack; and a third computer component for, based on the analysis that a tunneled packet is suspected to be part of a cyber-attack, taking at least one action to protect at least one of the vehicle components.

Optionally, the second computer component analyzes whether a tunneled packet is potentially harmful to the vehicle, by selecting at least one process from the group consisting of: inspecting the data in the packet for non-conformance to static requirements of correctness of a protocol; inspecting data in the packet for non-conformance to session-contextual requirements of correctness of a protocol; inspecting data in the packet for exploitation of a vulnerability in a protocol implementation; and inspecting the packet to determine whether it contains a bit pattern that is characteristic of cyber-attack packets.

Embodiments of the present invention are directed to a computer system to mitigate a cyber-attack on a linked vehicle. The computer system comprises: a storage medium for storing computer components; and a computerized processor for executing the computer components comprising: a first computer component for reception of a packet destined to a vehicle; a second computer component for analyzing whether the received packet is suspected to be part of a cyber-attack; and a third computer component for, based on the analysis that the received packet is suspected to be part of a cyber-attack, taking at least one action to protect at least one of the vehicle components.

Optionally, the second computer component analyzes whether a received packet is suspected to be part of a cyber-attack, by selecting at least one process from the group consisting of: inspecting the data in the packet for non-conformance to static requirements of correctness of a protocol; inspecting data in the packet for non-conformance to session-contextual requirements of correctness of a protocol; inspecting data in the packet for exploitation of a vulnerability in a protocol implementation; measuring the rate of packet arrival to determine whether a particular maximum threshold arrival rate has been exceeded; and inspecting the packet to determine whether it contains a bit pattern that is characteristic of cyber-attack packets.

Embodiments of the present invention are directed to a computer system to protect communications between a linked vehicle and a terrestrial peer, wherein the vehicle and terrestrial peer share a secret key. The computer system comprises: a storage medium for storing computer components; and a computerized processor for executing the computer components comprising: a first computer component for applying an encryption algorithm to data for transmission; a second computer component for applying an integrity protection algorithm to data for transmission, to create a cryptographic hash; and a third computer component for transmitting the encrypted data and cryptographic hash to the remote peer using a format recognized by the remote peer.

Embodiments of the present invention are directed to a computer system to protect communications between a linked vehicle and a terrestrial peer, wherein the vehicle and terrestrial peer share a secret key. The computer system comprises: a storage medium for storing computer components; and a computerized processor for executing the computer components comprising: a first computer component for applying an integrity protection algorithm to received data and determining whether the result matches a received cryptographic hash; a second computer component for, according to the result of the matching of the cryptographic hash, applying a decryption algorithm to received data; and a third computer component for accepting the decrypted data for further processing.

Embodiments of the present invention are directed to a computer system for controlling access to network services within a linked vehicle. The computer system comprises: a storage medium for storing computer components; and a computerized processor for executing the computer components comprising: a first computer component for receiving a packet from a vehicle component; a second computer component for inspecting the packet to determine an associated application; a third computer component, for according to whether the determined associated application was HTTP, determining a requested URL; and a fourth computer component for, according to the determined application information, taking an action specified by vehicle policy.

Embodiments of the present invention are directed to a computer-usable non-transitory storage medium having a computer program embodied thereon for causing a suitable programmed system to mitigate a cyber-attack on a linked vehicle, by performing the following steps when such program is executed on the system, the steps comprising: receiving a packet from a vehicle component; and tunneling the received packet to a terrestrial-based security service.

Optionally, the steps additionally comprise, prior to the tunneling of the received packet to a terrestrial-based security service: classifying the packet; and, based on the result of the classification, tunneling the received packet to a terrestrial-based security service.

Embodiments of the present invention are directed to a computer-usable on-transitory storage medium having a computer program embodied thereon for causing a suitable programmed system to mitigate a cyber-attack on a linked vehicle, by performing the following steps when such program is executed on the system, the steps comprising: receiving a tunneled packet from a linked vehicle; analyzing whether a tunneled packet is suspected to be part of a cyber-attack; and based on the analysis that a tunneled packet is suspected to be part of a cyber-attack, taking at least one action to protect at least one of the vehicle components.

Optionally the analysis of whether a tunneled packet is suspected to be part of a cyber-attack is performed by selecting at least one process from the group consisting of: inspecting the data in the packet for non-conformance to static requirements of protocol correctness; inspecting data in the packet for non-conformance to session-contextual requirements of protocol correctness; inspecting data in the packet for exploitation of a vulnerability in a protocol implementation: inspecting the packet to determine whether it includes a bit pattern that is characteristic of cyber-attack packets.

Embodiments of the present invention are directed to a computer-usable non-transitory storage medium having a computer program embodied thereon for causing a suitable programmed system to mitigate a cyber-attack on a linked vehicle, by performing the following steps when such program is executed on the system, the steps comprising: reception, by a terrestrial-based security service, of a packet destined to a vehicle; analyzing whether the received packet is suspected to be part of a cyber-attack; and based on the analysis that the received packet is suspected to be part of a cyber-attack, taking at least one action to protect at least one of the vehicle components.

Optionally, the analysis of whether a tunneled packet is suspected to be part of a cyber-attack by selecting at least one process from the group consisting of inspecting the data in the packet for non-conformance to static requirements of correctness of a protocol; inspecting data in the packet for non-conformance to session-contextual requirements of correctness of a protocol; inspecting data in the packet for exploitation of a vulnerability in a protocol implementation; measuring the rate of packet arrival to determine whether a particular maximum threshold arrival rate has been exceeded; and inspecting the packet to determine whether it includes a bit pattern that is characteristic of cyber-attack packets.

Embodiments of the present invention are directed to a computer-usable non-transitory storage medium having a computer program embodied thereon for causing a suitable programmed system to protect communications between a linked vehicle and a terrestrial peer, by performing the following steps when such program is executed on the system, the steps comprising: applying an encryption algorithm to data for transmission; applying an integrity protection algorithm to data for transmission, to create a cryptographic hash; and transmitting the encrypted data and cryptographic hash to the remote peer using a format recognized by the remote peer.

Embodiments of the present invention are directed to A computer-usable non-transitory storage medium having a computer program embodied thereon for causing a suitable programmed system to protect communications between a linked vehicle and a terrestrial peer, by performing the following steps when such program is executed on the system, the steps comprising: applying an integrity protection algorithm to received data and determining whether the result matches a received cryptographic hash; according to the result of the matching of the cryptographic hash, applying a decryption algorithm to received data; and accepting the decrypted data for further processing.

Embodiments of the present invention are directed to a computer-usable non-transitory storage medium having a computer program embodied thereon for causing a suitable programmed system for controlling access to network services within a linked vehicle, by performing the following steps when such program is executed on the system, the steps comprising: receiving a packet from a vehicle component; inspecting the packet to determine an associated application; according to whether the determined associated application was HTTP, determining a requested URL; and, according to the determined application information, taking an action specified by vehicle policy.

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

The term "linked" as used herein includes both wired or wireless links, either direct or indirect, and placing the computers, including, servers, components and the like, in electronic and/or data communications with each other.

The term "tunneling" as used herein refers to any packet networking technique wherein a packet bearing a particular destination address is transmitted to different destination address. For example, the original packet (known as the "inner packet") may be placed as a payload in a new packet bearing a potentially different destination address (known as the "outer packet") and the outer packet is then transmitted. Alternatively, the original packet may be sent over, for example, a point-to-point link where the node bearing the different destination address resides on the remote side of the link. The term "tunnel" as used herein refers to a communication channel between a source and the endpoint (for example, the node identified by the destination address of an "outer packet"). The transmitter and receiver on the tunnel are herein referred to as "tunnel endpoints".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF DRAWINGS

Figure 1:
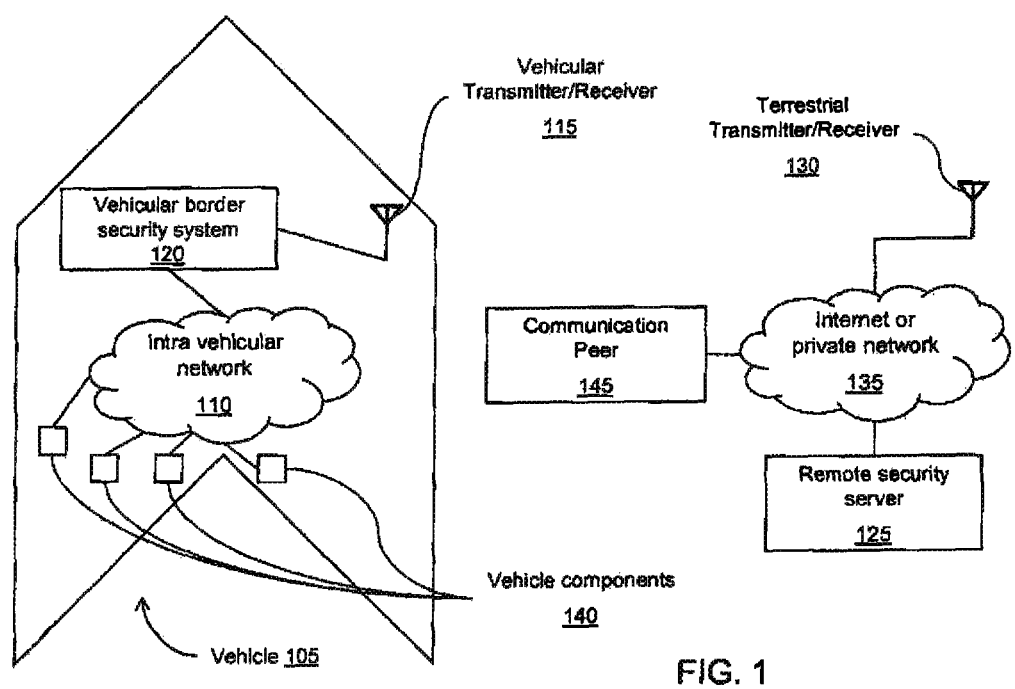
FIG. 1 is a diagram of a system environment in which an embodiment of the invention is deployed.

FIG. 1 is a depiction of a linked vehicle and terrestrial system employing an embodiment of the invention.

The Vehicle 105 includes an Intra-vehicular Network 110 and Vehicular Transmitter/Receiver 115. The Intra-vehicular Network 110 comprises, for example, an Ethernet or CAN-bus network linked to Vehicle Components 140 such as, for example, brakes, cameras, transmission, and the like. The Vehicular Transmitter/Receiver 115 utilizes, for example, a wireless medium such as IEEE 802.11 Wireless LAN, Bluetooth, or a cellular communications network. However the invention is equally applicable if, for example, a wired link is used instead.

The Vehicular Border Security System 120 is exemplarily responsible, in conjunction with the Remote Security Server 125, for maintaining security of the exchange of packet traffic between nodes in the Vehicle Components 140 and Communication Peers 145 outside the vehicle. The architecture of the Vehicular Border Security System is illustrated and described in detail below with reference to FIG. 2.

The Terrestrial Transmitter/Receiver 130 utilizes the same transmission medium as the Vehicular Transmitter/Receiver 115. The invention is equally applicable, however, if media converters, multihop wireless links, or the like are deployed. The Terrestrial Transmitter/Receiver 130 exemplarily conveys vehicle-originated packets to the Internet or a Private Network 135. A subset of these packets is eventually destined for the Remote Security Server 125. Similarly, packets destined to Vehicle Components 140 in the Vehicle 105 (whether from the Remote Security Server 125 or Communication Peers 145) are conveyed to the Vehicle 105 via the Internet or Private Network 135 and Terrestrial Transmitter/Receiver 130.

The Remote Security Server 125 provides security services to some or all packets originating from the vehicle before they are delivered to the Communication Peer 145, and for some or all packets from the Communication Peer 145 that are destined to the Vehicle 105. Mechanisms for selection and tunneling of packet traffic are described in detail below with reference to FIGS. 4 and 5. Exemplary security services which may be implemented are illustrated and described in detail below with reference to FIG. 7. The Remote Security Server 125 is depicted as a physical server. The invention is equally applicable, however, where the server is implemented, for example, as a virtual server in a cloud environment, or as a distributed function implemented in multiple servers, or the like.

Figure 2:
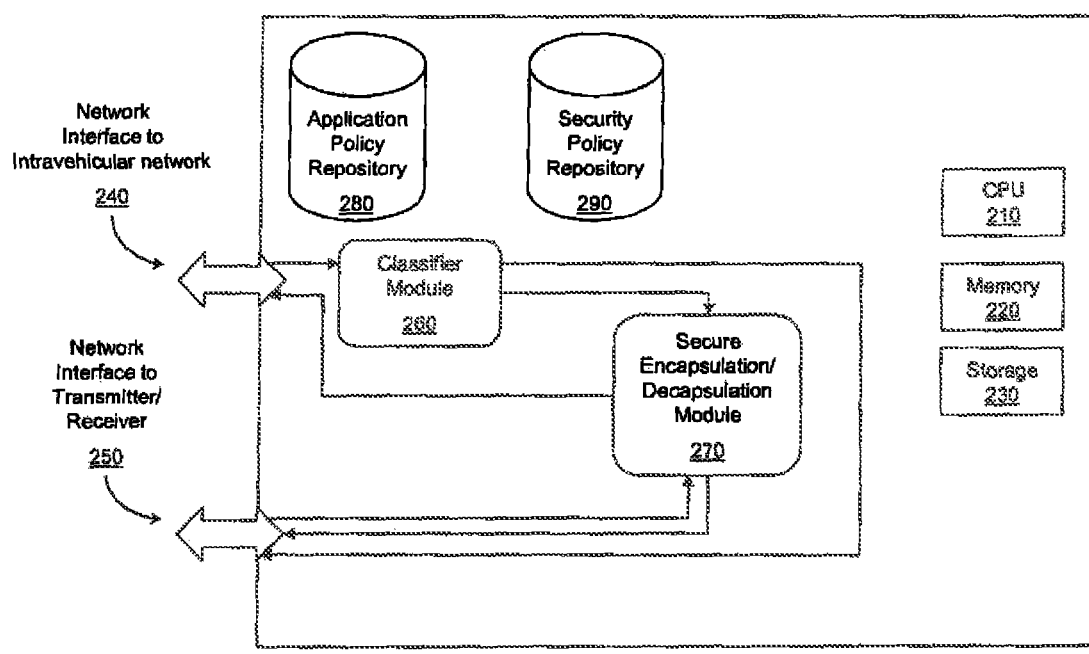
FIG. 2 is a diagram of the component architecture of the Vehicular Border Security System.

FIG. 2 is a depiction of the internal architecture of the Vehicular Border Security System 120. The Vehicular Border Security System 120 includes a central processing unit (CPU) 210 formed of one or more processors, electronically connected, including in electronic and/or data communication with Memory 220, Storage 230, Network Interface to Intravehicular Network 240 and Network Interface to Transmitter/Receiver 250, Classifier Module 260, and Secure Encapsulation/Decapsulation Module 270, Application Policy Repository 280, and Security Policy Repository 290.

Figure 4:
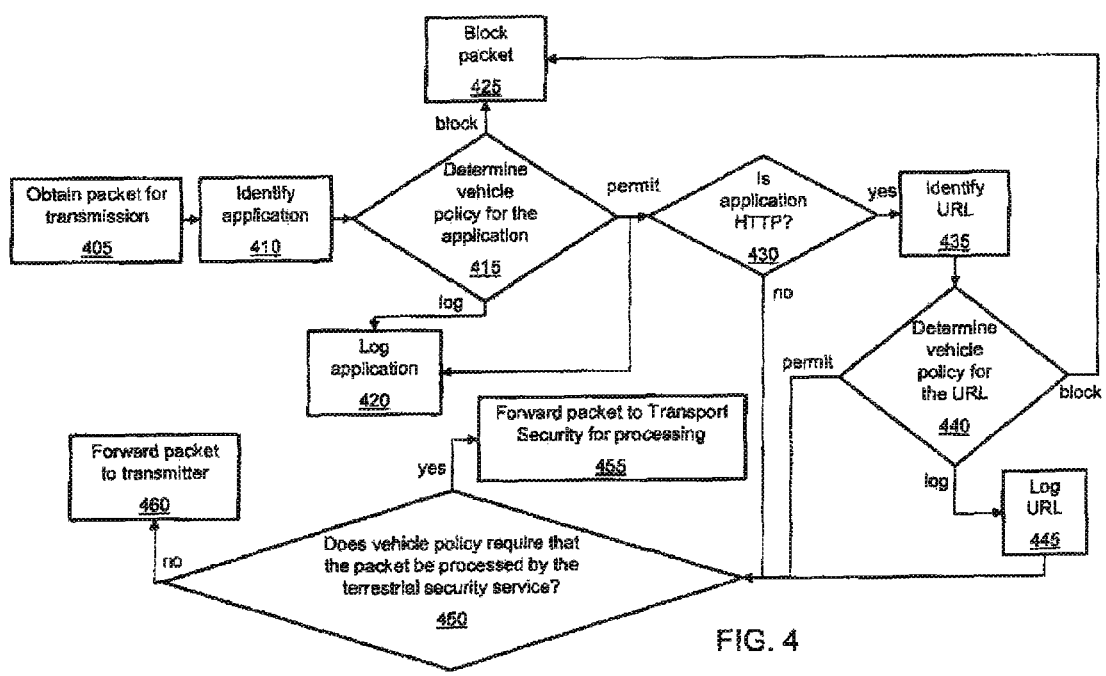
FIG. 4 is a flow diagram illustrating the process executed by the Classifier Module.
Figure 5:
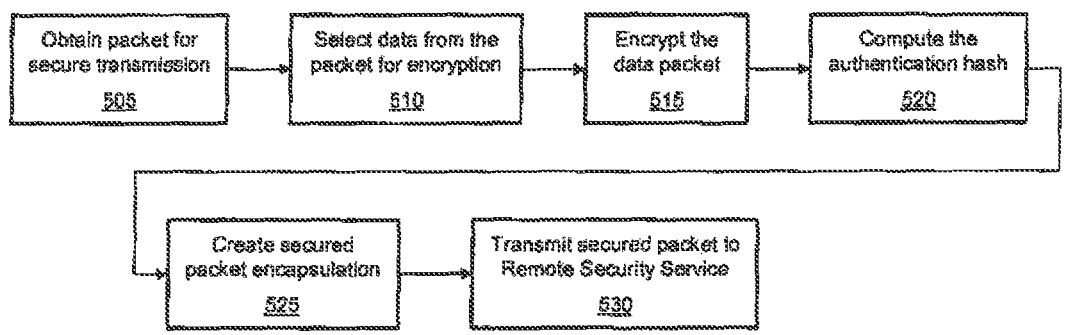
FIG. 5 is a flow diagram illustrating the transmit-direction process executed by the Secure Encapsulation/Decapsulation Module.
Figure 6:
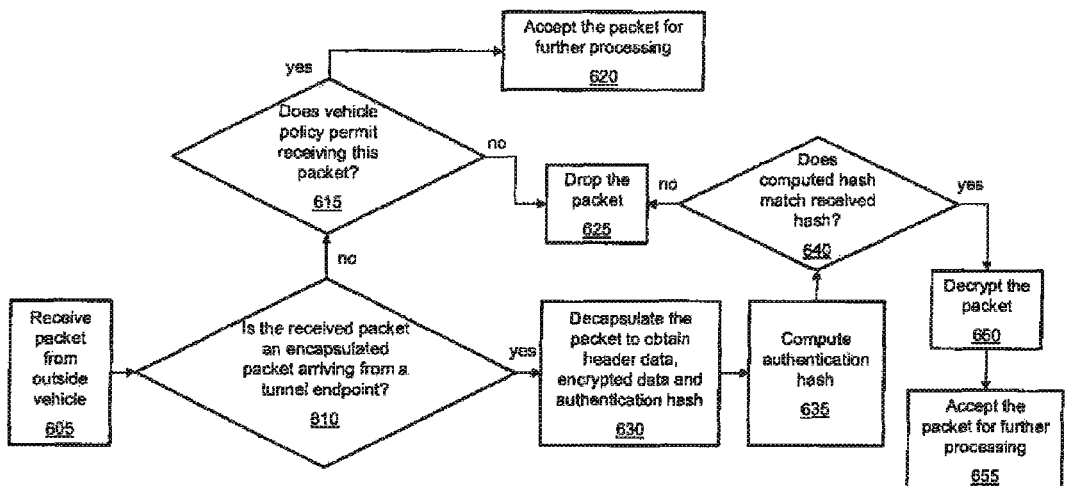
FIG. 6 is a flow diagram illustrating the receive-direction process executed by the Secure Encapsulation/Decapsulation Module.

The Central Processing Unit (CPU) 210 is formed of one or more processors, including physical or virtual microprocessors, for performing the Vehicular Border Security System 120 functions and operations including, for example controlling the memory 220, storage 230, Network Interface to Intravehicular Network 240 and Network Interface to Transmitter/Receiver 250, Classifier Module 260, and Secure Encapsulation/Decapsulation module 270, Application Policy Repository 280, and Security Policy Repository 290 along with the processes shown in FIGS. 4, 5, and 6. The processors are, for example, conventional processors, such as those used in servers, computers, and other computerized devices. For example, the processors may include x86 Processors from AMD and Intel, Xeon® and Pentium® processors from Intel, as well as any combinations thereof.

The Memory 220 is any conventional memory media. The Memory 220 stores machine executable instructions associated with the operation of the components, including, Network Interface to Intravehicular Network 240 and Network Interface to Transmitter/Receiver 250, Classifier Module 260, and Secure Encapsulation/Decapsulation module 270, Application Policy Repository 280, and Security Policy Repository 291) and all instructions for executing the processes of FIGS. 4, 5, and 6 and detailed herein. The processors of the CPU 210, Memory 220, and Storage 230 although each shown as a single component for representative purposes, may be multiple components, and may be outside of the Vehicular Border Security System 120, and linked to the Intravehicular Network 110 or Internet or Private Network 135.

The Network Interface to Intravehicular Network 240 is a physical, virtual, or logical data link for communication with the Vehicle Components 140 linked to the Intravehicular Network 110. Similarly, the Network Interface to Transmitter/Receiver 250 is a physical, virtual, or logical data link for communication with communication peers 145 external to the vehicle such as, for example, computers linked to the internet.

Packet flow from the vehicle to outside the vehicle is, for example, as follows: a Vehicle Component 140 transmits a packet on the Intravehicular Network 110. The packet arrives at the Network Interface to Intravehicular Network 240 component of the Vehicular Border Security System 120. The Classifier Module 260 component of the Vehicular Border Security System 120 then executes the process illustrated and described with reference to FIG. 4. There are various possible results of this process, including, for example, the following: the packet may be dropped due to security policy, the packet may be passed to the Network Interface to Transmitter/Receiver 250 for transmission, the packet may be passed to the Secure Encapsulation/Decapsulation Module 270 for encrypted and authenticated tunneling to the Remote Security Server 125 (as described in detail below with reference to FIG. 5).

Packet flow from outside the vehicle is, for example, as follows: a network node (on the Internet or Private Network 135) transmits a packet addressed to the vehicle. A packet (originating at, for example, the Remote Security Server 125 or a Communication Peer 145) is received at the Network Interface to the Transmitter/Receiver 250. The Secure Encapsulation/Decapsulation Module 270, for example, accepts the packet from the Network Interface to the Transmitter/Receiver 250 and executes the process illustrated and described with reference to FIG. 6. There are various possible results of this process, including, for example: the packet may be dropped; the packet may be immediately sent on the Network Interface to Vehicular Network 240; the packet may sent on the Network Interface to Vehicular Network 240 after being decapsulated and decrypted.

The Application Policy Repository 280 and Security Policy Repository 290 contain policies that are used by the decision functionality of the Classifier Module 260. These policies are set by, for example, a human or automated system administrator.

Figure 3:
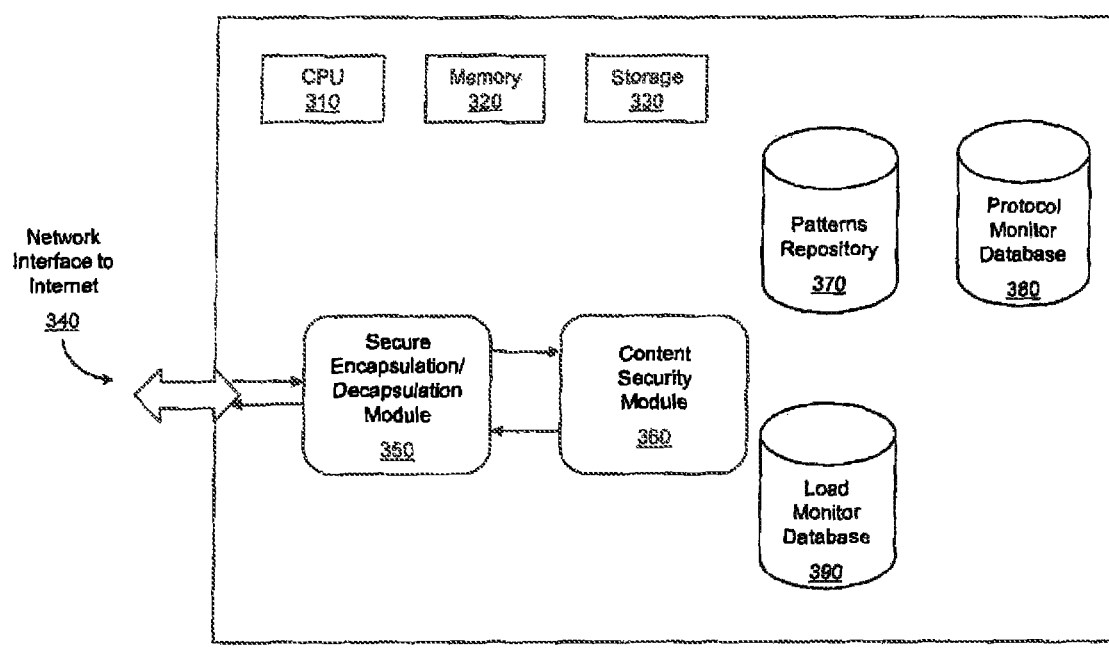
FIG. 3 is a diagram of the component architecture of the Remote Security Server.

FIG. 3 is a depiction of the internal architecture of the Remote Security Server 125.

The Remote Security Server 125 includes a central processing unit (CPU) 310 formed of one or more processors, electronically connected, including in electronic and/or data communication with Memory 320, Storage 330, Network Interface to Internet 340, Secure Encapsulation/Decapsulation Module 350, and Content Security Module 360, Patterns Repository 370, Protocol Monitor Database 380, and Load Monitor Database 390.

Figure 7:
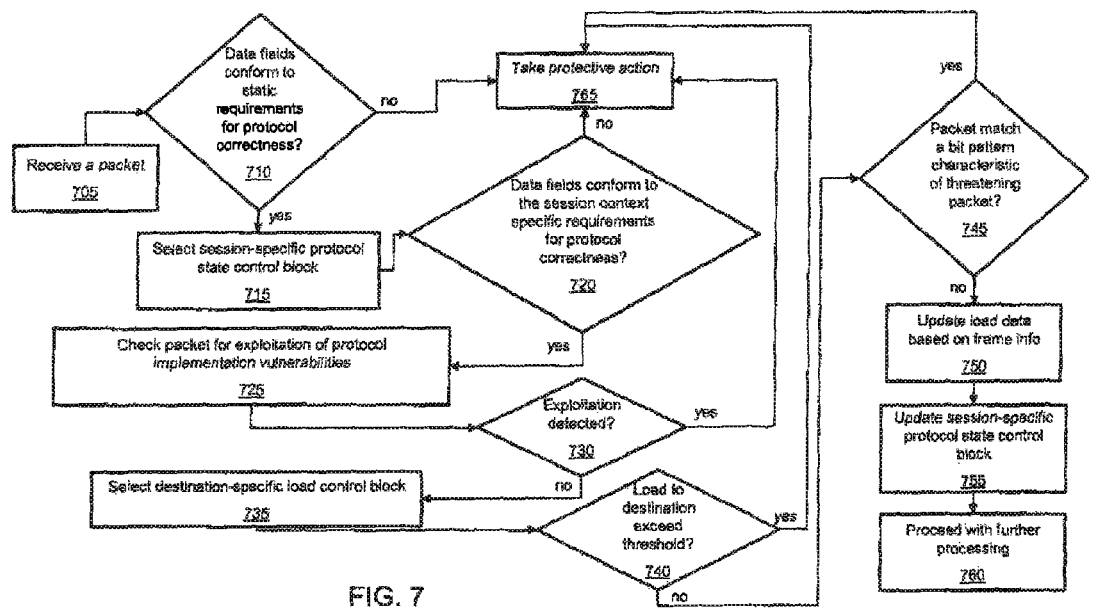
FIG. 7 is a flow diagram illustrating the process executed by the Content Security Module for handling packets from the vehicle to a communication peer, or from a communication peer to the vehicle.

The Central Processing Unit (CPU) 310 is formed of one or more processors, including physical or virtual microprocessors, for performing the Vehicular Border Security System 120 functions and operations including, for example, controlling the Memory 320, Storage 330, Network Interface to Internet 340, Secure Encapsulation/Decapsulation Module 350, Content Security Module 360, Patterns Repository 370, Protocol Monitor Database 380, and Load Monitor Database 390 along with the processes shown in FIGS. 5, 6, and 7. The processors are, for example, conventional processors, such as those used in servers, computers, and other computerized devices. For example, the processors may include x86 Processors from AMD and Intel, Xeon® and Pentium® processors from Intel, as well as any combinations thereof.

The Memory 320 is any conventional memory media. The Memory 220 stores machine executable instructions associated with the operation of the components, including, for example, Memory 320, Storage 330, Network Interface to Internet 340, Secure Encapsulation/Decapsulation Module 350, Content Security Module 360, Patterns Repository 370, Protocol Monitor Database 380, and Load Monitor Database 390 and all instructions for executing the processes of FIGS. 5, 6, and 7 detailed herein. The processors of the CPU 310, Memory 320, and Storage 330 although each shown as a single component for representative purposes, may be multiple components, and may be outside of the Remote Security Server 125, and linked to the Internet or Private Network 135.

The Network Interface to Internet 340 is a physical, virtual, or logical data link for communication with the Communication Peers 145 and Vehicles 105 linked to the Internet or Private Network 135.

The Secure Encapsulation/Decapsulation Module 350 is identical to the one included in the Vehicular Border Security System and is responsible for encrypted and authenticated tunneling to the Vehicular Border Security System (as described in detail below with reference to FIGS. 5 and 6).

The Content Security Module 360 performs security functionality on received packet, such as, for example, inspecting packets from the vehicle for signs of a security compromise (eg, by communicating with servers known to be associated with malware), inspecting packets destined to the vehicle for exploitation of known weaknesses of protocol stacks or for excessive packet traffic which could be indicative of a denial-of-service attack, or the like. An exemplary processes illustrating the functionality of the Content Security Module 360 appears below with reference to FIG. 7.

The Patterns Repository 370, Protocol Monitor Database 380, and Load Monitor Database 390 are databases used by the Content Security Module 360. Their use is described in detail below with reference to FIG. 7. The Patterns Repository 370, Protocol Monitor Database 380, and Load Monitor Database 390 are, for example, implemented using any database technology, such as, for example, SQL server or the like.

FIG. 4 is a flow diagram that illustrates the process executed in the Classifier Module 260.

The Classifier Module 260 performs, for example, a sequence of classification and security policy determinations and policy execution operations on each received packet. These operations include, for example, determining whether the networked application being invoked from within the vehicle should be permitted/blocked/logged and performing the blocking/logging, determining whether the Uniform Resource Locator (URL) being requested over Hypertext Transfer Protocol from within the vehicle should be permitted/blocked/logged and performing the blocking/logging, determining whether the packet or packet flow should be treated by the Remote Security Server 125 and tunneling the packet to the Remote Security Server 125.

At block 405, the system obtains a packet from, for example, the Network Interface to the Intravehicular Network 240. At block 410, the system identifies the application associated with the packet. The system may accomplish this by, for example, inspecting the Transmission Control Protocol (TCP) port fields (as each value pair of TCP port fields typically includes a value that uniquely identifies the application). Alternatively, User Datagram Protocol (UDP) port examination, Deep Packet Inspection (DPI), or the like may be employed. In some circumstances, the application may not, for example, be detectable in a particular packet, but rather, for example, by examining a series of packets belonging to a particular session, or by maintaining state awareness of the application previously detected for a particular session.

At Block 415, the system determines the vehicle policy for the detected application. The system determines the policy, for example, by looking up a record for the application in the Application Policy Repository 280. The policy outcome, may be, for example, to block the application, in which case control moves to block 425 and the packet is blocked. Alternatively, the policy outcome may be, for example, to permit the packet, in which case control moves to block 430. The policy outcome may also be, for example, to log the application usage, in which case control moves to block 420 and the use of the application is stored to a system log before control moves to block 430. Note that an alternative embodiment may include more or fewer policy dispositions, such as, for example, logging the application attempt before blocking the packet.

Note that an embodiment may eliminate, for example, the application processing logic from the Classifier Module. In such a case, control moves from Block 410 directly to Block 430.

At Block 430, the system determines if the application is HTTP. The system, makes this determination by, for example, determining if a packet is addressed to TCP port 80. If the packet is indeed HTTP, control moves to block 435 and a URL is identified by, for example, inspecting the data located at the offset of the HTTP packet where the URL data is located. At Block 440, the vehicle policy for the URL is evaluated by, for example, looking up a record for the URL in the Application Policy Repository 280. The policy outcome, may be, for example, to block the URL, in which case control moves to block 425 and the packet is blocked. Alternatively, the policy outcome may be, for example, to permit the URL, in which case control moves to block 450. The policy outcome may also be, for example, to log the URL, in which case control moves to block 445 and the request of the specific URL is stored to a system log before control moves to block 450. Note that an alternative embodiment may include more or fewer policy dispositions, such as, for example, logging the URL before blocking the packet.

Note that an embodiment may omit, for example, the HTTP URL processing logic from the Classifier Module. In such a case, control moves from Block 415 directly to Block 450.

At Block 450, the system determines whether the vehicle policy requires that the packet be transmitted to the Remote Security Server 125 for security processing. The system determines this by, for example, performing Deep Packet Inspection (DPI) on the packet and comparing the results with records stored in the Security Policy Repository 290. If policy does not indicate that Remote Security Service processing is required, then the control moves to block 460 and the system simply forwards the packet onward for transmission. However if policy indicates that Remote Security Service processing is required, then the control moves to block 455 and the system forwards the packet to the Secure Encapsulation/Decapsulation Module 270 so that the packet can be tunneled to the Remote Security Service.

FIG. 5 is a flow diagram that illustrates the process executed in the Secure Encapsulation/Decapsulation Module 270 and 350 for packets travelling outbound. The function of the Secure Encapsulation/Decapsulation Module 270 and 350 is to perform the tunneling of the packet between the Vehicular Border Security Module 120 and the Remote Security Server 125 while ensuring the privacy and authenticity of this traffic.

At Block 505, the system obtains a packet for secured transmission. The packet arrives from, for example, the Classifier Module 260 of the Vehicular Border Security Module 120 or the Content Security Module 360 of the Remote Security Server 125. At Block 510, the system selects the portion of the packet that will be encrypted. The portion of the packet that will be encrypted is embodiment-dependent. For example, the system may encrypt the entire layer-3 packet (including headers) and then encapsulate the encrypted layer-3 packet in a new set of layer-2 and layer-3 headers (as is done when IPSEC tunnel-mode is used). Alternatively, the system may extract the Transmission Control Protocol (TCP) payload data, and then encrypt it as part of a new Transport Layer Security (TLS) session with the tunnel destination (ie. the Vehicular Border Security Module 120 or the Remote Security Server 125) as in done in TCP proxying, or the like.

At Block 515, the system encrypts the selected packet data using, for example, a block cipher such as Advanced Encryption Standard-Counter Mode (AES-CTR) or the like in conjunction with an encryption key shared between the Vehicular Border Security Module 120 and the Remote Security Server 125. Alternatively, a stream cipher, for example, may be used.

An authentication hash is a keyed cryptographic checksum which enables a recipient to confirm that received data was not forged or altered en route. At Block 520, an authentication hash is computed using, for example Advanced Encryption Standard Cipher-based Message Authentication Code (AES-CMAC) or the like in conjunction with an authentication hash key shared between the Vehicular Border Security Module 120 and the Remote Security Server 125. Note that the functions in Blocks 515 and 520 may be combined, such as the case where a method such as AES-GCM is used to simultaneously generate both encrypted data and authentication hash.

At block 525, a secured tunnel packet is created. The secured tunnel packet carries or encapsulates the original packet and is addressed to, for example, either the Vehicular Border Security Module 120 or the Remote Security Server 125. The format of the encapsulation is embodiment-dependent. For example, the system may encrypt the entire layer-3 packet (including headers) and then encapsulate the encrypted layer-3 packet in a new set of layer-2 and layer-3 headers which includes the authentication hash (as is done when IPSEC tunnel-mode is used). Alternatively, the system may extract the Transmission Control Protocol (TCP) payload data, and then encrypt it as part of a new Transport Layer Security session with the tunnel destination (ie. the Vehicular Border Security Module 120 or the Remote Security Server 125) as in done in TCP proxying, or the like.

At block 530, the system transmits the packet, for example, on the Network Interface to Transmitter/Receiver 240 or Network Interface to Internet 340, so that the packet will be conveyed over the Internet or Private Network 135 to the tunnel destination (ie. for example, the Vehicular Border Security Module 120 or the Remote Security Server 125).

FIG. 6 is a flow diagram that illustrates the process executed in the Secure Encapsulation/Decapsulation Module 270 and 350 for inbound packets.

At Block 605, a packet is received. At Block 610, the packet is examined to determine, for example, if the packet is arriving from a tunnel endpoint (for example, the Vehicular Border Security System 120 or the Remote Security Server 125) using the expected encapsulation. The system makes this determination by, for example, examining the Internet Protocol (IP) source address of the packet and TCP source and destination port and comparing with values used for the Remote Security Server 125 and for the expected encapsulation.

If the packet is in fact from a tunnel endpoint (for example, the Vehicular Border Security System 120 or the Remote Security Server 125) and in the expected encapsulation, then at Block 630 the packet is decapsulated and the encrypted data and authentication hash are extracted. At Block 635, the system independently computes the authentication hash (using, for example, the encrypted data, shared authentication hash key, and shared authentication algorithm). At block 640, the computed hash value is compared to the value received in the encapsulation. If they match, then at Block 650 the packet data is decrypted. and at Block 655 the decapsulated packet is accepted for further processing (for example, forwarding to the Network Interface to Intravehicle Network 240 or to the Content Security Module 360). If at Block 640 the computed value and received value did not match, then control moves to Block 625 and the packet is dropped.

If, at block 610, the packet was determined to have arrived from a source other than a tunnel endpoint or with an unexpected encapsulation, it is necessary to determine if vehicle policy permits the packet. At Block 615, the system consults the vehicle policy, for example by consulting a record in the Security Policy Repository 290 in the case of the Vehicular Border Security System 120 (note that in the case of the Remote Security Server 125 the policy is always to accept the packet). If the policy does not permits the packet, then at block 625 the packet is dropped. If the policy permits the packet, then at block 620 it is accepted for further processing (for example forwarding on the Network Interface to Intravehicular Network 240 or processing by the Content Security Module 360).

FIG. 7 is a flow diagram that exemplarily illustrates the process executed by the Content Security Module on packets received from a Communication Peer 145 for a Vehicle 105, or from a Vehicle 105 for a Communication Peer 145.

At Block 705 a packet is received from, for example, the Secure Encapsulation/Decapsulation Module 350. The interface between the Secure Encapsulation/Decapsulation Module 350 and the Content Security Module 360, for example, communicates to the Content Security Module 360 whether the received packet is a packet from a Communication Peer 145 for a Vehicle 105 or a decapsulated tunnelled packet from a Vehicle 105 to a Communication Peer 145.

Cyber-attacks may include packets which include data fields with illegal values. At Block 710 the system evaluates whether the data fields of the received packet conform to static requirements for protocol correctness. The term "static requirements" refers to requirements that do not depend on the protocol session context. For example, if a protocol of a packet is Internet Protocol (IP), the system may check, for example, that the source address and destination address are legitimate addresses, that the protocol number field is a legitimate value, or the like. If the data fields of the packet violate static requirements of correctness for a protocol, then at Block 765 protective action is taken. Protective action may comprise actions such as: dropping the packet, raising an alert, or the like.

Cyber-attacks may include packets which meet the static requirements for correctness, but do not conform to the proper behavior of a protocol session. For example, an attacker may transmit Transmission Control Protocol (TCP) data after a TCP connection has been reset. To prevent exploitation of stateful protocol vulnerabilities, the Content Security Module 360 maintains per-session state information within the Protocol Monitor Database 380. At Block 715, the system accesses the state control information for the particular session to which this packet belongs. At Block 720 the system evaluates, for example, the received packet together with the session state as reflected in the retrieved state control information to determine if the packet conforms to the stateful requirements for protocol correctness. If a violation was found, control is transferred to Block 765 and protective action is taken.

At Block 725, the system evaluates the packet together with the session state as reflected in the retrieved state control information to determine if it contains an exploit directed to a vulnerability in a particular protocol implementation. For example, an attacker may set a packet field to a particular value in order to exploit a buffer overflow defect in, for example, a widely-deployed protocol implementation. At Block 730 the system checks whether an exploit was found, and if so control is transferred to Block 765 and protective action is taken.

To prevent attacks based on flooding a destination with packets, the Content Security Module 360 maintains load information within the Load Monitor Database 390, for example, for each known packet destination in the vehicle. Blocks 735 and 740 are thus, for example, omitted from the process for packets travelling from the Vehicle 105 to a Communication Peer 145 as there is no load information available.

At Block 735, the system accesses the load data for the vehicular destination to which this packet is destined. At Block 740 the system evaluates the received packet together with the load as reflected in the retrieved load data to determine if the packet rate exceeds, for example, an established load threshold. If the threshold load was exceeded, control is transferred to Block 765 and protective action is taken.

At Block 745 the system checks whether the packet matches any bit patterns that are associated with cyber-attack-related packets. The bit patterns to check for are retrieved, for example, from the Patterns Repository 370. For example, these might identify packets that are addressed to or from a particular server that is known be malicious. If such a match is found, control is transferred to Block 765 and protective action is taken.

At Block 750 the load data in the Load Monitor Database 390 is, for example, updated. At Block 755, the state information for this session in the Protocol Monitor Database 380 is, for example, updated. At Block 760, the packet is passed on for further processing such as, for example, tunneling to the Vehicle 105 via the Secure Encapsulation/Decapsulation Module 350 or transmission to the Communication Peer 145.

The description of the Content Security Module provided herein is for exemplary purposes only A particular embodiment of the invention may, for example, implement a subset of the functionality described herein, implement the operations in a different order than the one described here, or implement additional security functions.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the an to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for communicating with a linked vehicle, comprising:
   receiving a packet, over a communications network, by a terrestrial-based security service remotely located from the vehicle, the packet being addressed to a vehicle component on an intravehicular network fully retained in the vehicle and linked to the communications network;
   determining if the received packet is suspected to be part of a cyber-attack;
   analyzing the received packet to determine a handling of the received packet in response to the received packet being suspected to be part of the cyber-attack;
   should the analyzing determine the handling of the received packet to be transmission of the received packet, encrypting a portion of the received packet and encapsulating the encrypted packet to alter the destination address of the encrypted packet from the vehicle component to a security service located inside the vehicle and linked with the intravehicular network encapsulating being based in part on the encrypting; and
   forwarding the encapsulated packet to the security service module for security processing.

2. The method of claim 1, wherein the determining if the received packet is suspected to be part of the cyber-attack includes performing in parallel at least a majority of processes selected from the group consisting of:
   inspecting data in the packet for non-conformance to static requirements of correctness of a protocol;
   inspecting data in the packet for non-conformance to session-contextual requirements of correctness of a protocol;
   inspecting data in the packet for exploitation of a vulnerability protocol implementation;
   measuring a rate of packet arrival to determine whether a particular maximum threshold arrival rate has been exceeded; and
   inspecting the packet to determine whether the packet includes a bit pattern that is characteristic of cyber-attack packets.

3. The method of claim 1, further comprising:
   should the analyzing determine the handling of the received packet not to be transmission of the received packet, taking at least one protective action.

4. The method of claim 3, wherein the at least one protective action includes blocking the packet.

5. The method of claim 3, wherein the at least one protective action includes issuing an alert.

6. The method of claim 1, further comprising:
   determining the source of the encapsulation of the encapsulated packet and based on the determined source, extracting the encrypted packet from the encapsulated packet and processing the encrypted packet for decryption; and based on the decryption processing, forwarding the decrypted packet the vehicle component or dropping the decrypted packet.

7. A method of protecting communications between a linked vehicle and a terrestrial peer remotely located from the vehicle, wherein vehicle and terrestrial peer share a secret key, the method comprising:
   sending a packet from a vehicle component on an intravehicular network fully retained in the vehicle, the packet being addressed to the terrestrial peer;
   receiving the packet, on a security service module located inside vehicle and linked to the intravehicular network, prior to delivery to the terrestrial peer;
   determining if the received packet is suspected to be part of a cyber-attack;
   analyzing the received packet to determine a handling of the received packet in response to the received packet being suspected to be part of the cyber-attack; and
   should the analyzing determine the handling of the received packet to be transmission of the received packet, performing the following by the security service module:
   encrypting a portion of the received packet,
   generating an authentication hash associated with the encrypted packet,
   encapsulating the encrypted packet and the authentication has to generate an encapsulated packet, the encapsulated packet has terrestrial-based security service module as a destination address, the terrestrial-based security service module remotely located from the vehicle and linked with the terrestrial peer over a wired or wireless network, the encapsulating being based in part on the encrypting, and
   forwarding the encapsulated packet for transmission using a format recognized by the terrestrial-base security service module for extraction of the encrypted packet and authentication hash from the encapsulated packet, by the terrestrial-based security service module, and for decryption processing and forwarding of the extracted encrypted packet to the terrestrial peer.

8. The method of claim 7, wherein the encrypted portion of data includes the packet header, and wherein the format used for transmitting is the Internet Protocol Security (IPSEC) format.

9. The method of claim 7, wherein the packet includes Transmission Control Protocol (TCP) payload data, and wherein the encrypted portion of data includes the TCP payload data, and wherein the format used for transmitting is the Transport Layer Security (TLS) format.

10. A method for controlling access to network services within a linked vehicle, comprising:
    sending a packet from a vehicle component on an intravehicular network fully retained in the vehicle, the packet being addressed to a communication peer remotely located from the vehicle;
    receiving the packet on a security service module located inside vehicle and linked to the intravehicular network, prior to delivery to the communication peer;
    inspecting, by the security service module, the received packet to determine a Hypertext Transfer Protocol (HTTP) application associated with the received packet;
    identifying a requested Uniform Resource Locator (URL) of the HTTP application and determining a policy of the security service module for handling the requested URL; and
    should the determined policy indicate a requirement for additional security processing of the encrypted packet, encrypting a portion of the received packet and encapsulating the encrypted packet to generate an encapsulated packet, the encapsulated packet having a terrestrial-based security service module as a destination address, the terrestrial-based security service module remotely located from the vehicle and linked with the terrestrial peer over a wired or wireless network, the encapsulating being based in part on the encrypting.

11. The method of claim 10, further comprising: logging use of the HTTP application.

12. The method of claim 10, further comprising: logging the requested URL of the HTTP application.

13. A system for communicating with a linked vehicle, comprising:
a non-transitory computer readable storage medium for storing computer components; and,
a computerized processor for executing the computer components comprising:
a first computer module configured for:
receiving a packet over a communications network terrestrial-based security service remotely located from the vehicle, the packet being addressed to a vehicle component on an intravehicular network fully retained in the vehicle and linked to the communications network,
determining if the received packet is suspected to be part of a cyber-attack, and
analyzing the received packet to determine a handling of the received packet in response to the received packet being suspected to be part of the cyber-attack; and
a second computer module configured for:
should the analyzing determine the handling of the received packet to be transmission of the received packet, encrypting a portion of the received packet and encapsulating the encrypted packet to alter the destination address of the encrypted packet from the vehicle component to a security service module located inside the vehicle and linked with the intravehicular network, the encapsulating being based in part on the encrypting, and
forwarding the encapsulated packet to the security service module for security processing.

14. The system of claim 13, wherein the first computer module determine if the received packet is suspected to be part of the cyber-attack, by performing in parallel at least a majority of processes selected from the group consisting of:
inspecting data in the packet for non-conformance to requirements of correctness of a protocol;
inspecting data in the packet for non-conformance to session-contextual requirements of correctness of a protocol;
inspecting data in the packet for exploitation of a vulnerability protocol implementation;
measuring a rate of packet arrival to determine whether a part maximum threshold arrival rate has been exceeded; and
inspecting the packet to determine whether the packet contains a bit pattern that is characteristic of cyber-attack packets.

15. The system of claim 13, further comprising:
a third computer module configured for:
receiving the encapsulated encrypted packet,
determining the source of the encapsulation of the encapsulated packet, and based on the determined source, extracting encrypted packet from the encapsulated packet and processing encrypted packet for decryption, and
based on the decryption processing, forwarding decrypted packet to the vehicle component or dropping the packet.

16. A computer-usable non-transitory storage medium having a computer program embodied thereon for causing a suitable programmed system to communicate with a linked vehicle, by performing the following steps such program is executed on the system, the steps comprising:
receiving a packet over a communication network, by a terrestrial-based security service remotely located from the vehicle, the packet being addressed to a vehicle component on an intravehicular network fully retained in the vehicle and linked to the communications network;
determining if the received packet is suspected to be part of a cyber-attack;
analyzing the received packet to determine a handling of the received packet in response to the received packet being suspected to be part of the cyber-attack;
should the analyzing determine the handling of the received packet to be transmission of the received packet, encrypting a portion of the received packet encapsulating the encrypted packet to alter the destination address of encrypted packet from the vehicle component to a security service module located inside the vehicle and linked with the intravehicular network, the encapsulating being based in part on the encrypting; and
forwarding the encapsulated packet to the security service module security-processing.

17. The computer-usable non-transitory storage medium of claim 16, wherein the determining if the received packet is suspected to be part of the cyber-attack includes performing in parallel at least a majority of processes selected from the group consisting of:
inspecting the data in the packet for non-conformance to static requirements of correctness of a protocol;
inspecting data in the packet for non-conformance to session-contextual requirements of correctness of a protocol;
inspecting data in the packet for exploitation of a vulnerability protocol implementation;
measuring the rate of packet arrival to determine whether a particular maximum threshold arrival rate has been exceeded; and
inspecting the packet to determine whether it includes a bit pattern that is characteristic of cyber-attack packets.

* * * * *